United States Patent [19]
Hamer et al.

[11] Patent Number: 5,020,047
[45] Date of Patent: May 28, 1991

[54] METHOD AND DEVICE FOR RADIATION BEAM SCANNING A RADIATION-SENSITIVE SURFACE OF A ROTATING CARRIER

[75] Inventors: René H. Hamer; Cornelis P. DuPau, both of Eindhoven, Netherlands

[73] Assignee: U.S. Philips Corporation, New York, N.Y.

[21] Appl. No.: 197,364

[22] Filed: May 23, 1988

Related U.S. Application Data

[63] Continuation-in-part of Ser. No. 99,568, Sep. 22, 1987, Pat. No. 4,864,554.

[30] Foreign Application Priority Data

Jun. 22, 1987 [NL] Netherlands ............... 8701448

[51] Int. Cl.⁵ .............. G11B 19/24; G11B 17/22
[52] U.S. Cl. .................... 369/240; 369/32; 369/233
[58] Field of Search ........ 358/289, 342; 369/32, 369/43, 50, 44, 95, 116

[56] References Cited

U.S. PATENT DOCUMENTS

| | | | |
|---|---|---|---|
| 4,079,942 | 3/1978 | Kunen | 369/240 |
| 4,397,011 | 8/1983 | Ogawa | 369/50 |
| 4,439,849 | 3/1984 | Nebeshima | 369/240 |
| 4,500,982 | 2/1985 | Yoshida | 369/240 |
| 4,543,650 | 9/1985 | Wachi | 369/50 |
| 4,680,746 | 7/1987 | Senso | 369/240 |
| 4,700,337 | 10/1987 | Inagawa et al. | 369/240 |
| 4,757,489 | 7/1988 | Yamagishi | 369/240 |
| 4,864,554 | 9/1989 | Homer et al. | 369/50 |

Primary Examiner—Stuart S. Levy
Assistant Examiner—Kenneth B. Wells
Attorney, Agent, or Firm—Leroy Eason

[57] ABSTRACT

A method and device are revealed for scanning a radiation-sensitive layer (2) of a rotating carrier (4) with a constant linear velocity by means of a radiation beam (5) which is directed towards the carrier (4) by an optical system (6) which is radially movable relative to the carrier (4). A velocity-pulse generator (10) generates clock pulses (Ps) of a frequency (fs) proportional to the angular velocity of the carrier (4). A clock generator (25) generates clock pulses (Pk) of constant frequency (fk). In response to every clock pulse (Pk) a sum value (Sw) is corrected by a first correction value (DEC). In response to every velocity pulse (Ps) the sum value is corrected by a second correction value (INC) having a sign opposite to that of the first correction value. The angular velocity (W) of the record carrier is controlled to a value for which the average of the sum value (Sw) remains constant. The ratio between the second (INC) and first correction value (DEC) is maintained at a value which is proportional to the distance (Xr) between the point of incidence of the radiation beam (5) on the carrier and the center of rotation. Thus, scanning is effected with a constant linear scanning velocity.

8 Claims, 7 Drawing Sheets

METHOD AND DEVICE FOR RADIATION BEAM SCANNING A RADIATION-SENSITIVE SURFACE OF A ROTATING CARRIER

This is a continuation-in-part of application Ser. No. 099,568, filed Sept. 22, 1987 which is now matured into U.S. Pat. No. 4,864,554 issued on Sept. 5, 1989.

BACKGROUND OF THE INVENTION

1. Field of the Invention

The invention relates to a method of scanning a radiation-sensitive surface of a disc-shaped carrier which rotates about a centre of rotation by means of a radiation beam which is directed towards the carrier, the angular velocity of the carrier being substantially inversely proportional to the distance between the centre of rotation and the point of incidence of the radiation beam on the carrier, and clock pulses of predetermined frequency and velocity pulses of a frequency proportional to the angular velocity of the carrier being generated.

The invention further relates to a device for scanning a radiation-sensitive surface of a rotating carrier by means of a radiation beam, comprising a drive system for rotating the carrier about an axis, an optical system which is radially movable relative to the record carrier, for directing the radiation beam towards the carrier, a velocity control circuit for controlling the angular velocity of the carrier to a value which is substantially inversely proportional to the distance between the centre of rotation and the point of incidence of the radiation beam on the carrier, which control circuit comprises a clock generator for generating clock pulses and a velocity-pulse generator for generating velocity pulses of a frequency proportional to the angular velocity of the carrier.

2. Description of the Related Art

Such a method and device are used in manufacturing optically readable record carriers to be read with a constant linear velocity. During scanning of the radiation-sensitive surface on the carrier, for example a photoresist, the radiation beam is modulated in conformity with the information to be recorded. After this, the scanned carrier is subjected to a photo-etching process, yielding a record carrier having the desired information structure, of which subsequently replicas can be made. A method and device of the general type described in the foregoing are known from U.S. Pat. No. 4,190,860.

In the method and device disclosed in this patent, the angular velocity of the carrier is controlled by means of phase-locked loop techniques, the angular velocity of the carrier being controlled in such a manner that the velocity pulses remain in phase with reference pulses of a frequency proportional to the desired angular velocity. These reference pulses are derived from the clock pulses by means of a frequency divider having a variable divisor. The divisor is derived from the radial position of an optical system for directing the radiation beam to the carrier. A scanning device provided with such an angular velocity control has the drawback that when the control system is rendered operative additional control systems are necessary to bring the angular velocity of the reference carrier at a value at which the frequency difference between the reference pulses and the velocity pulses is sufificiently low to establish phase-locking. Moreover, phase-locked loop techniques have the disadvantage that they are not well suited to be carried out by means of a programmable circuit, for example a microcomputer.

A further drawback of the known scanning device is that only a limited number of different scanning speeds can be obtained, because only integral divisors are permitted in deriving the reference pulses. In particular, in the manufacture of optical record carriers, which have to comply with very stringent accuracy requirements, this is a drawback.

The last-mentioned drawback can be mitigated by the use of very large divisors for the frequency division. However, this has the disadvantage that the frequency of the clock signal must be very high. These very high frequencies make it virtually impossible to provide angularvelocity control with a satisfactory adjustment accuracy by means of a programmable circuit.

SUMMARY OF THE INVENTION

It is an object of the invention to provide a method and device as defined in the opening paragraphs, which mitigate the above drawbacks. With respect to the method this object is accomplished in accordance with the invention in that in response to a clock pulse a sum value is corrected by a first correction value and in response to a velocity pulse the sum value is corrected by a second correction value of a sign opposite to that of the first correction value, the angular velocity of the record carrier being controlled depending on the sum value to a value for which the average of the sum value is substantially constant, and the ratio between the second and first correction value being maintained at a value proportional to said distance by adapting the first and/or the second correction value.

As regards the device said object is achieved in accordance with the invention in that the velocity control circuit comprises means for correcting a sum value by a first correction value in response to a clock pulse, means for correcting a sum value by a second correction value, control means for controlling the angular velocity depending on the sum value to a value for which the average sum value remains constant, and adaptation means for adjusting the angular velocity to a value proportional to said distance by adapting the first and-/or the second correction value.

In the method in accordance with the invention the angular velocity of the record carrier is controlled to a value for which the sum value remains constant, which means that the frequency of the velocity pulses, which frequency is proportional to the angular velocity, is maintained equal to the quotient of the first and the second correction value multiplied by the clock-pulse frequency. Since the angular velocity of the record carrier is proportional to the quitient of two adjustable correction values the velocity can be controlled very accurately. Moreover, for the required accuracy the frequency of the clock signal can remain sufficiently low to enable the method to be carried out by means of programmable circuits.

During control of the angular velocity the sum value varies at a frequency equal to the velocity-pulse frequency or the clock-pulse frequency, whichever is lower. In order to prevent these variations from adversely affecting the angular velocity, it is desirable that the frequency of the sum-value variations is situated far outside the bandwidth of the angular-velocity control system. Compared with the generation of high-frequency clock pulses generating a velocity signal with a large number of velocity pulses per revolution of the record carrier by means of the customary pulse discs or a.c. tachogenerators is technically difficult, so that it is preferred to select the clock-pulse frequency to be higher than the velocity-pulse frequency corresponding to the desired angular velocity. This is the simplest method of obtaining a sufficiently high frequency for the sum value variations.

The influence of said sum value variations can be eliminated completely if for controlling the angular velocity only the sum values at instants corresponding to a predetermined phase of the velocity pulses are selected.

If, as will generally be the case, the frequency of the clock pulses is not a multiple of the frequencies of the velocity pulses, the number of clock pulses generated in the interval between two consecutive velocity pulses is not the same for all the intervals, resulting in a low-frequency oscillation in the selected sum values, which oscillation has an adverse effect on the angular velocity control. Such an adverse effect can be precluded by deriving the clock pulses from a periodic signal of a higher frequency by means of a cyclic counter, a clock pulse being generated each time that a final count is reached, to correct the selected sum value by a third correction value equal to the ratio between the number of clock pulses counted, as represented by the instantaneous count, and the counting range of the counter, multiplied by the first correction value, and the angular velocity of the record carrier being controlled to a value for which the average of the corrected selected sum value is substantially constant.

In this way it is achieved that the difference between consecutive control values always corresponds to the difference between the second correction value and the first correction value, multiplied by the ratio between the clock frequency and the velocity-signal frequency, so that the difference between two consecutive control values always corresponds to the difference between the desired and the actual angular velocity of the record carrier, as a result of which the oscillation in the angular velocity control is eliminated.

BRIEF DESCRIPTION OF THE DRAWING

Embodiments of the invention and further advantages thereof will now be described in more detail, by way of example, with reference to FIGS. 1 to 15, of which

DESCRIPTION OF THE PREFERRED EMBODIMENTS

Figure 1:
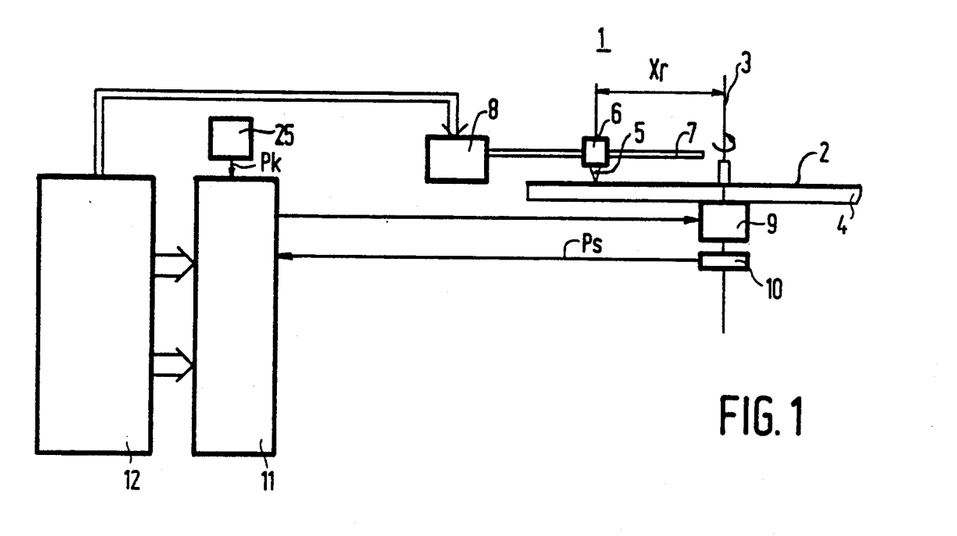
FIG. 1 shows an embodiment of a device in accordance with the invention for scanning a radiation-sensitive surface of a carrier.

FIG. 1 shows a scanning device 1 for scanning a layer 2 of a radiation-sensitive material, for example a photoresist, by means of a radiation beam 5, which layer is deposited on a carrier 4, for example a glass substrate, which rotates about an axis 3. The radiation beam 5 is directed towards the layer 2 by means of an optical system 6. The optical system 6 can be moved in a radial direction relative to the record carrier 4 by means of a spindle 7 which is driven via a servo system 8. In a customary manner the servo system 8 controls the radial position Xr of the optical system 6 to obtain a desired positional value, which is set by a central processing means 12. The carrier 4 is rotated by means of a drive system comprising a d.c. motor 9. A pulse generator, for example a pulse disc or a.c. tachogenerator 10 which is mechanically coupled to the motor, generates velocity pulses Ps of a frequency proportional to the angular velocity W of the motor 9 and the carrier 4. The velocity pulses Ps are applied to the control circuit 11 for controlling the angular velocity W of the carrier 4 to a desired angular-velocity value Wg, which can also be set by means of the control circuit 12.

As the layer 2 is being scanned the optical system 6 is radially moved by means of the central processing means 12 and the servo system 8. The desired value Xrg for the position of the optical system, which position corresponds to the distance Xr between the point of incidence of the radiation beam 5 and the centre of rotaion represented by the axis 3, is controlled in conformity with a predetermined function (see FIG. 4) of time by the central processing means 12. Moreover, the central processing means 12 controls the desired angular velocity Wg to a value which is inversely proportional to the distance Xr, so that the linear scanning velocity is always maintained constant. The central processing means 12 may comprise, for example, a computer of a customary type, in which the function values of the said function at equidistant instants are stored in a look-up table. During scanning the function values of the function at the equidistant instants are read from the table and the desired position Xrg is controlled in conformity with the read-out function value. Moreover, the desired value Wg can be controlled in conformity with the desired position Xrg. The settings of the desired values of Wg and Xrg as a function of time may also be computed in accordance with a predetermined algorithm during scanning.

Scanning devices 1 of the type described in the foregoing are mainly used in the manufacture of optically readable discs of the CLV type, which must be read with a constant linear velocity. During scanning of the layer 2 the radiation beam 5 is modulated in conformity with the information to be recorded. Subsequently, the layer 6 is developed by means of, for example, a photo-etching process in which the scanned portions of the layer 2 are removed, after which a master disc having the desired information structure is obtained, from which master replicas are made.

Figure 2:
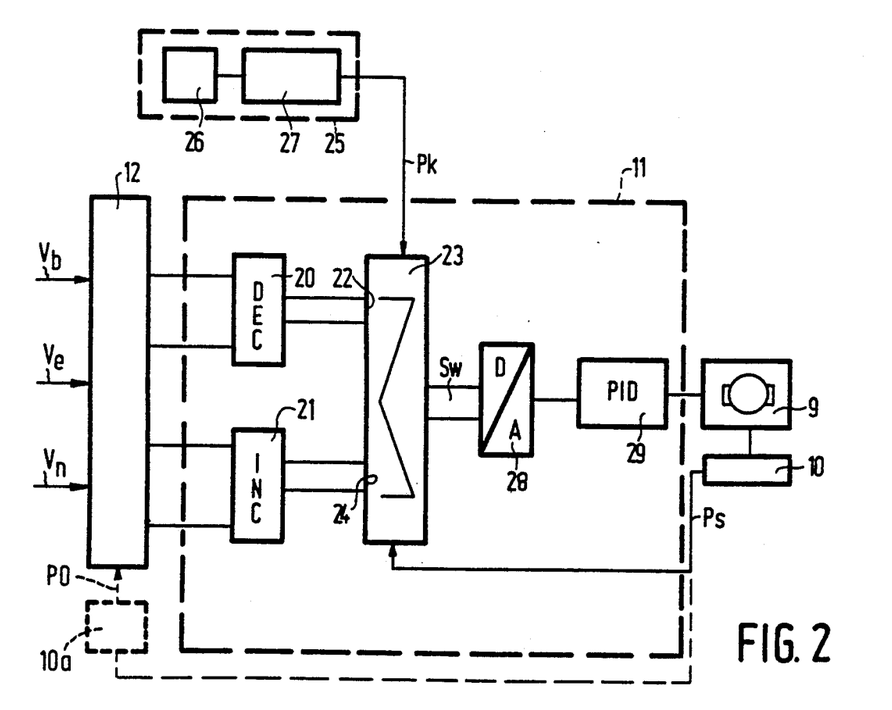
FIG. 2 shows an example of a control circuit for use in the scanning device of FIG. 1.

FIG. 2 shows in detail an example of the velocity control circuit 11. The control circuit 11 comprises a first register 20 and a second register 2u, which can be loaded with a first digital correction value DEC and a second digital correction value INC respectively by the central processing means 12. The outputs of the register 20 are connected to inputs 22 of an accumulator circuit 23.

The outputs of the register 21 are connected to the inputs 24 of the accumulator circuit 23. The velocity pulses Ps are also applied to the accumulator circuit 23. Clock pulses Pk of constant frequency fk are also applied to the accumulator circuit 23. The clock pulses Pk are generated by means of a conventional clock generator 25 comprising an oscillator 26 and a frequency divider 27.

Figure 3:
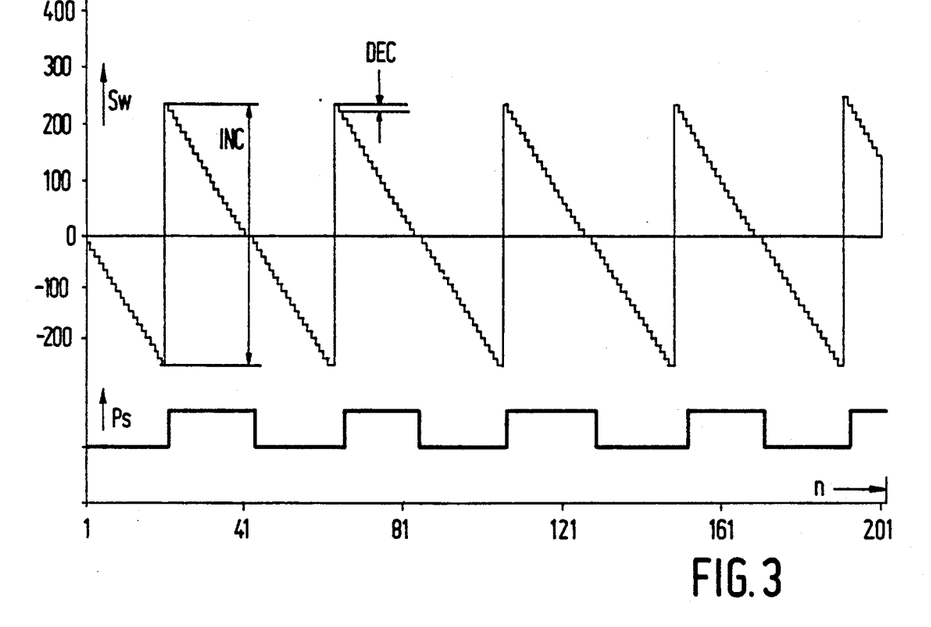
FIG. 3 shows signals generated in the control circuit of FIG. 2.

The accumulator circuit 23 is of a type which in response to a clock pulse Pk decrements a digital sum value Sw by the digital correction value DEC applied to the inputs 22 and in response to a velocity pulse Ps increments the sum value Sw by the digital correction value INC applied to the inputs 24. The sum value Sw is transferred to a digital-to-analog converter 28 which converts the digital sum value Sw into a corresponding analog signal, which is applied to an analog controller 29, for example a PID controller, for energising the motor 9 in conformity with the sum value Sw so as to maintain the average of the sum value Sw constant. The operation of the velocity control circuit will now be described in more detail with reference to FIG. 3, which represents the sum value Sw in the velocity pulses Ps as a function of the number n of generated clock pulses Pk. In response to the positive edge of the velocity pulse Ps the sum value Sw is incremented by the value INC. In response to every clock pulse Pk the sum value is decremented by the value DEC. The sum value Sw thus obtained is converted into an analog signal, which is applied to the controller 29. The bandwidth of the control loop comprising the velocity control circuit 11, the motor 9 and the a.c. tachogenerator 10 and the frequencies of the clock pulses Pk and the velocity pulses Ps are adapted to one another in such a way that the frequency of the variation in the sum value Sw, which frequency is equal to the frequency of the velocity pulses Pk, is so high that it is situated well outside the bandwidth of the control loop, which ensures that the variation of the sum value Sw hardly affects the angular velocity W. The motor 9 is then energised in such a way that the average value is maintained at a constant value, in the present case zero.

The PID controller 29 is dimensioned in such a way that if the average sum value Sw exceeds said constant value the energising current of the motor 9 decreases, causing the number of revolutions of the motor 9 and hence the frequency fs of the velocity pulses Ps to decrease. The number of increments of the sum value Sw per unit of time is consequently reduced, so that the average sum value Sw decreases until it has become equal to said constant value.

In the case that the average sum value Sw is larger than the constant value the energisation will be adapted accordingly until the average sum value has again become equal to the constant value. In the case of a constant average sum value Sw the value INC multiplied by the frequency fs of the velocity pulses Ps is equal to the value DEC multiplied by the frequency fk of the clock pulses Pk. The angular velocity W of the motor and hence that of the record carrier 9 complies with the following relationship.

$$W = 2\pi(fk \times DEC/INC)/N \quad (1)$$

where N is the number of velocity pulses Pk per revolution of the motor 9.

Since the angular velocity is adjustable by adjusting the quotient of the values INC and DEC, the number of possible settings is very large, yielding a very accurate control.

Figure 5:
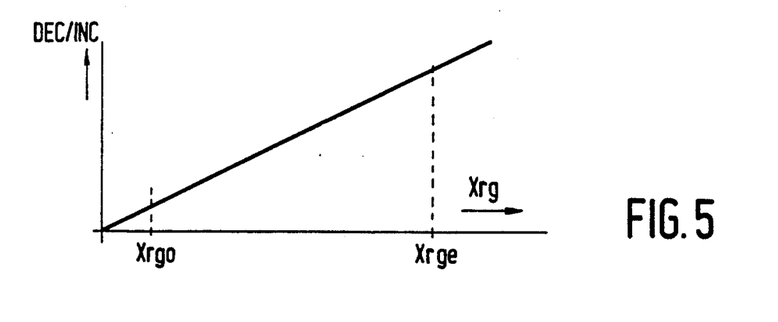
FIG. 5 represents the relationship between the desired radial position Xrg and the ratio between the correction values INC and DEC.

When the carrier 4 is scanned with a constant scanning velocity the desired angular velocity can therefore be established simply and very accurately by the central processing means 12 by adjusting the quotient INC/DEC to a value which is proportional to the distance Xr between the point of incidence of the radiation beam 5 and the axis 3. This may be effected, for example, by deriving the value to which the quotient INC/DEC is to be set from the desired value Xrg (see FIG. 5).

However, it is alternatively possible to store the values INC and DEC in the memory of the central processing means (see FIG. 8), or to compute these values as functions of time as two functions related to the desired variation in time of Xrg.

In another embodiment, which is attractive because of its simplicity, the three following signals are applied to the control circuit prior to the scanning process:

a first signal Vb which indicates the desired angular velocity of the carrier at the beginning of the scanning process, a second signal Ve which indicates the desired angular velocity of the carrier at the end of the scanning process, a third signal Vn which indicates the number of revolutions to be made between the beginning and the end of the scanning process.

On the basis of the signal Vb a suitable combination of values for INC and DEC is selected, for which the angular velocity corresponds to the value indicated by the signal Vb. By means of the signal Ve, for the value of DEC already determined, the value of INC is determined for which the angular velocity is in conformity with the value indicated by the signal Ve. From the two values determined for INC and the number of revolutions indicated by Vn an adaptation value $\Delta$inc is computed, which indicates by how much the value of INC must be increased per X revolutions (X being an integer, for example 1 or 2) in order to make the value of INC change as a linear function of the number of revolutions during the scanning process. During the scanning process the value of DEC is maintained constant. Moreover, by means of a frequency divider 10a X revolution pulses Po per revolution of the carrier 4 are derived from the velocity pulses Ps. The revolution pulses are applied to the control circuit 12, for example to a program-interrupt input. The control circuit has been loaded with an interrupt control routine which is responsive to every revolution pulse Po to adapt the value of INC with the adaptation value $\Delta$inc. Since the angular velocity of the carrier is inversely proportional to the value of INC, a velocity control is obtained where the angular velocity is inversely proportional to the number of revolutions made and, consequently, inversely proportional to the radial position of the scanning spot on the carrier, provided that, as is customary, the radial displacement per revolution is constant. It is to be noted that, in principle, the radial velocity of the optical system 6 can be controlled similarly to the angular velocity.

In order to minimise the influence of variations in sum value Sw it is desirable to select the lower of the two frequencies Fs and fk so as to be as high as possible. Since it is easier to increase the frequency fk than to increase the number N of velocity pulses Ps generated per revolution of the motor 9, it is preferred to dimension the control loop in such a way that at the desired angular velocity Wg the frequency fk of the clock pulses Pk is higher than the frequency fs of the velocity pulses Ps.

Figure 6:
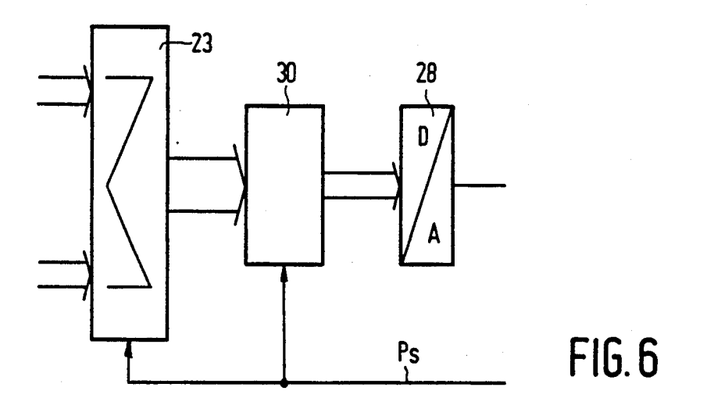
FIG. 6 shows a modification of the control circuit of FIG. 2.

FIG. 6 shows a modified control circuit 11 enabling the influence of the variation of the sum value Sw on the angular velocity W to be substantially eliminated. This modification involves a memory 30, for example a clocked register arranged between the accumulator circuit 23 and the digital-to-analog converter 28. The memory 30 is loaded with the sum value Sw at instants corresponding to a predetermined phase of the velocity pulses Ps. If, as in the example shown, the relative pulse width (duty cycle) of the velocity pulses Ps is constant, the memory 30 may comprise a register which is controlled by the negative edges of the velocity pulses Ps.

Figure 7:
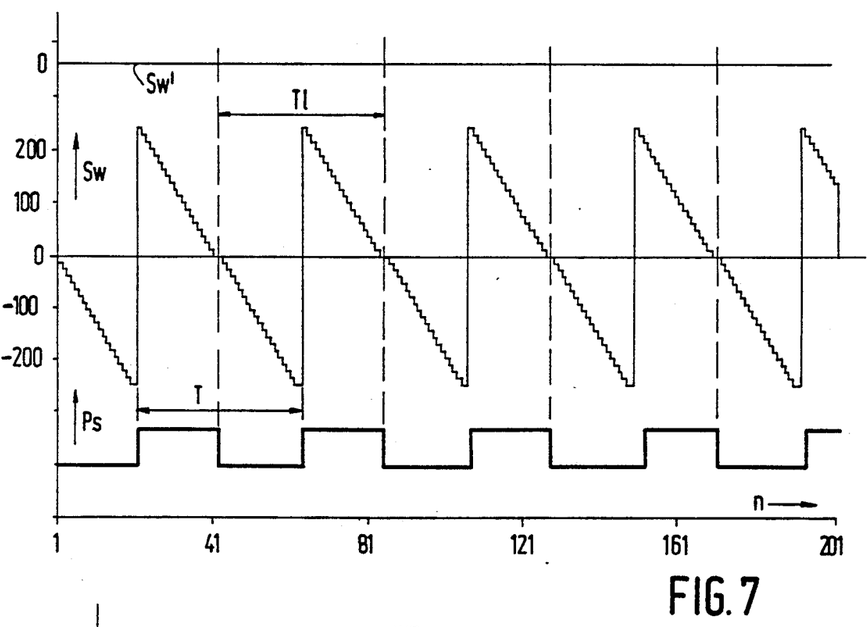
FIGS. 7 and 9 show signals generated in the modified control circuit of FIG. 6.

In addition to the sum value Sw and the velocity pulses Ps FIG. 7 also shows the output signal Sw of the memory 30 as a function of the number n of clock pulses Pk. The time intervals T1 between the loading instants of the memory 30 are equal to the period T of the velocity pulses Ps, so that the variation of Sw corresponds to the value of DEC minus k times the value of INC, k being the number of clock pulses Pk per time interval T1. If, as in the present example, the ratio INC/DEC is an integer, the angular velocity W is controlled to a value for which the ratio between the frequency fk and the frequency fs is also an integer.

This means that the difference in sum value Sw' between the loading instants of the memory 30 (which is equal to the difference DEC−k.INC) is exactly zero, so that a particularly stable control of the angular velocity W is obtained. However, if as in general, the quotient INC/DEC is not an integer the angular velocity W will be controlled to a non-zero value for the difference (=DEC−k. INC) between the sum values Sw' at two successive loading instants. Moreover, the number of clock pulses between two consecutive loading instants is then nor always the same. This results in a low-frequency oscillation of the sum value Sw and the selected sum value Sw' at the outputs of the memory 30.

Figure 9:
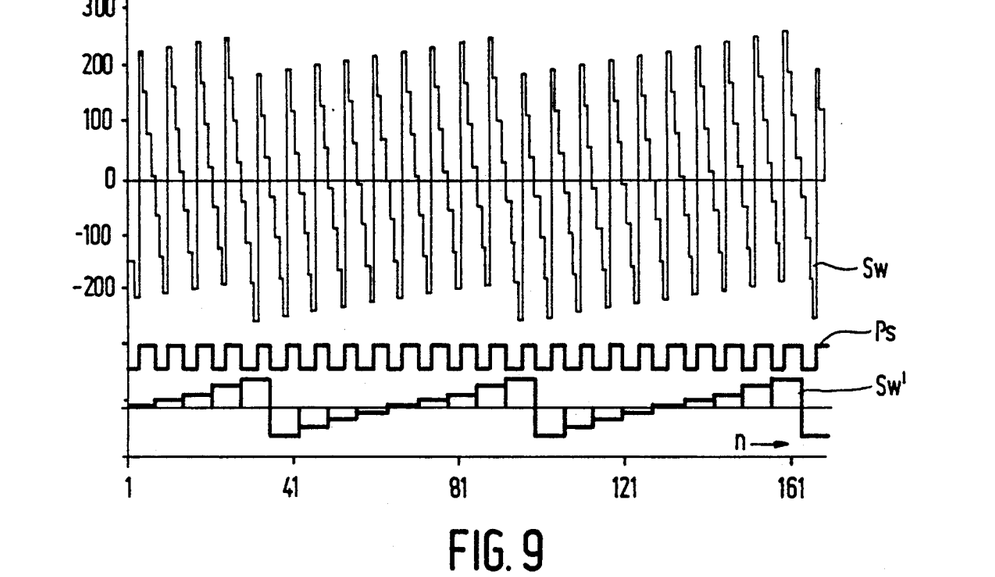

FIG. 9 shows this low-frequency oscillation of Sw and Sw' for a value of INC/DEC=3000/512. In order to prevent this oscillation from adversely affecting the control behaviour, the bandwidth of the control loop may be selected in such a way that the frequency of the oscillation is situated outside the control band.

Figure 10:
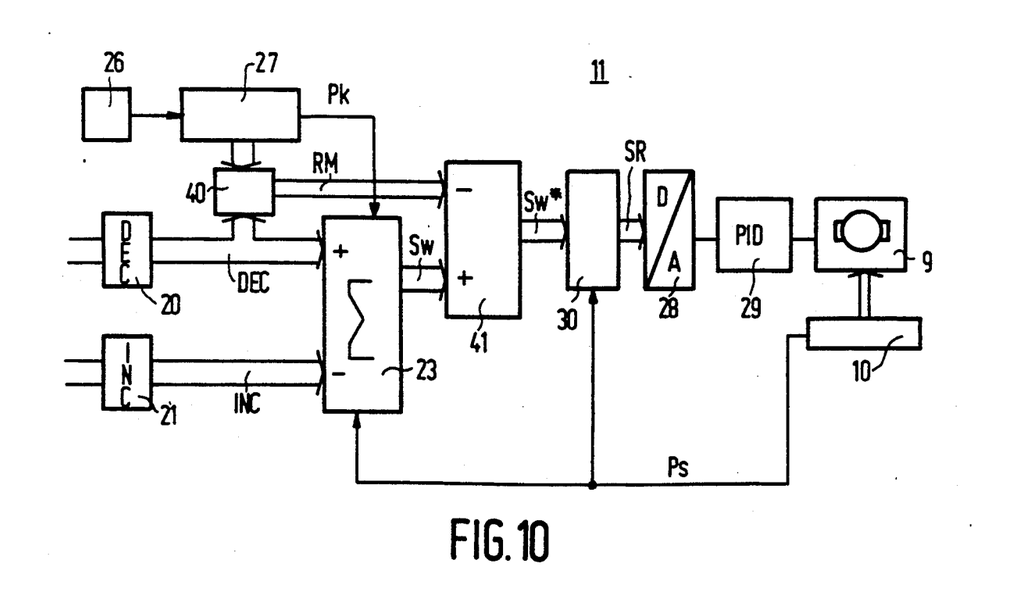
FIG. 10 shows another example of the control circuit.

An example of the velocity control circuit 11 which does not exhibit the above undesired oscillations is shown in FIG. 10, in which elements corresponding to the elements shown in FIGS. 2 and 6 bear the same reference numerals.

The frequency divider 27 of the control circuit 11 shown in FIG. 10 comprises a cyclic counter which counts the pulses generated by the oscillator 26 and which, after having reached a maximum count MAX, is set to zero and at the same time generates a clock pulse Pk. The count TEL of the counter is applied to a first input of a multiplier circuit 40. The value of DEC stored in the register 20 is applied to the other input of the multiplier circuit 40. The multiplier circuit 40 is dimensioned in such a way that the result on the output is equal to TEL/MAX×DEC.

By means of a subtractor circuit 41 the result RM of the multiplication is subtracted from the sum value Sw, which is available on the output of the accumulator circuit 23. The result Sw+ of the subtraction is applied to the input of the memory 30. The value of Sw+ is loaded into the memory 30 at loading instants defined by the negative edges of the velocity pulses Ps.

The control value SR thus derived from the sum value Sw and the value RM and appearing on the output of the memory 30 is applied to the controller 30 via the digital-to-analog converter 28.

Alternatively, the low-frequency oscillation can be eliminated by applying the result of the multiplication performed by the multiplier 40 to the accumulator circuit 23 and by changing the sum value by the difference (INC−RM) in response to a velocity pulse. In that case the subtractor circuit may be dispensed with and the output signal of the accumulator circuit 23 can be applied directly to the memory 30.

Further, it is to be noted that if the divisor of the frequency divider is selected to be equal to the numerical value of DEC, the multiplier may be dispensed with.

Figure 11:
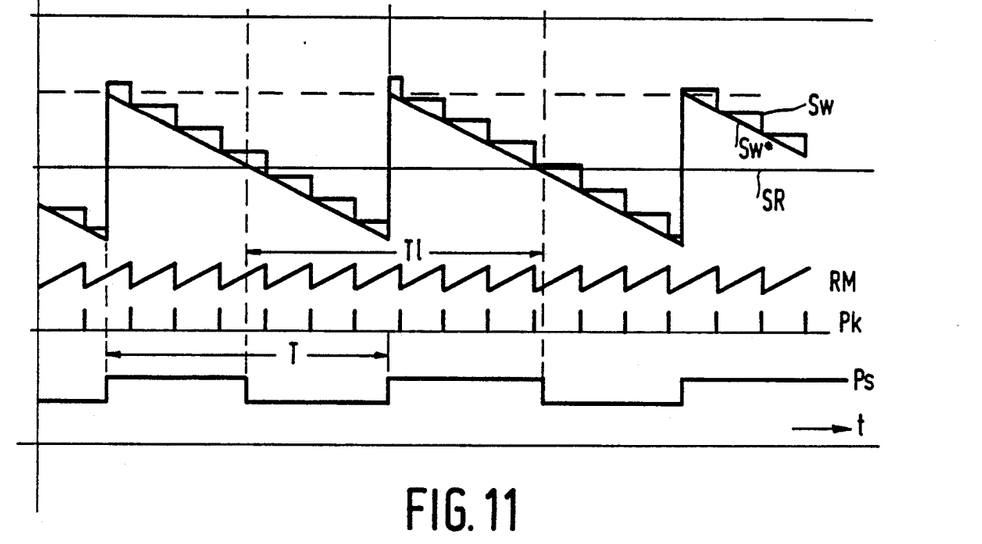
FIG. 11 shows signals generated in the control circuit of FIG. 10.

FIG. 11 shows the velocity pulses Ps, the clock pulses Pk, the sum value SW, the value SW+, and the control value SR as functions of time t. As is apparent from FIG. 11, the low-frequency oscillation is completely eliminated from SW+ and hence from the control value SR as a result of the correction of the sum value Sw by the value RM.

Figure 12:
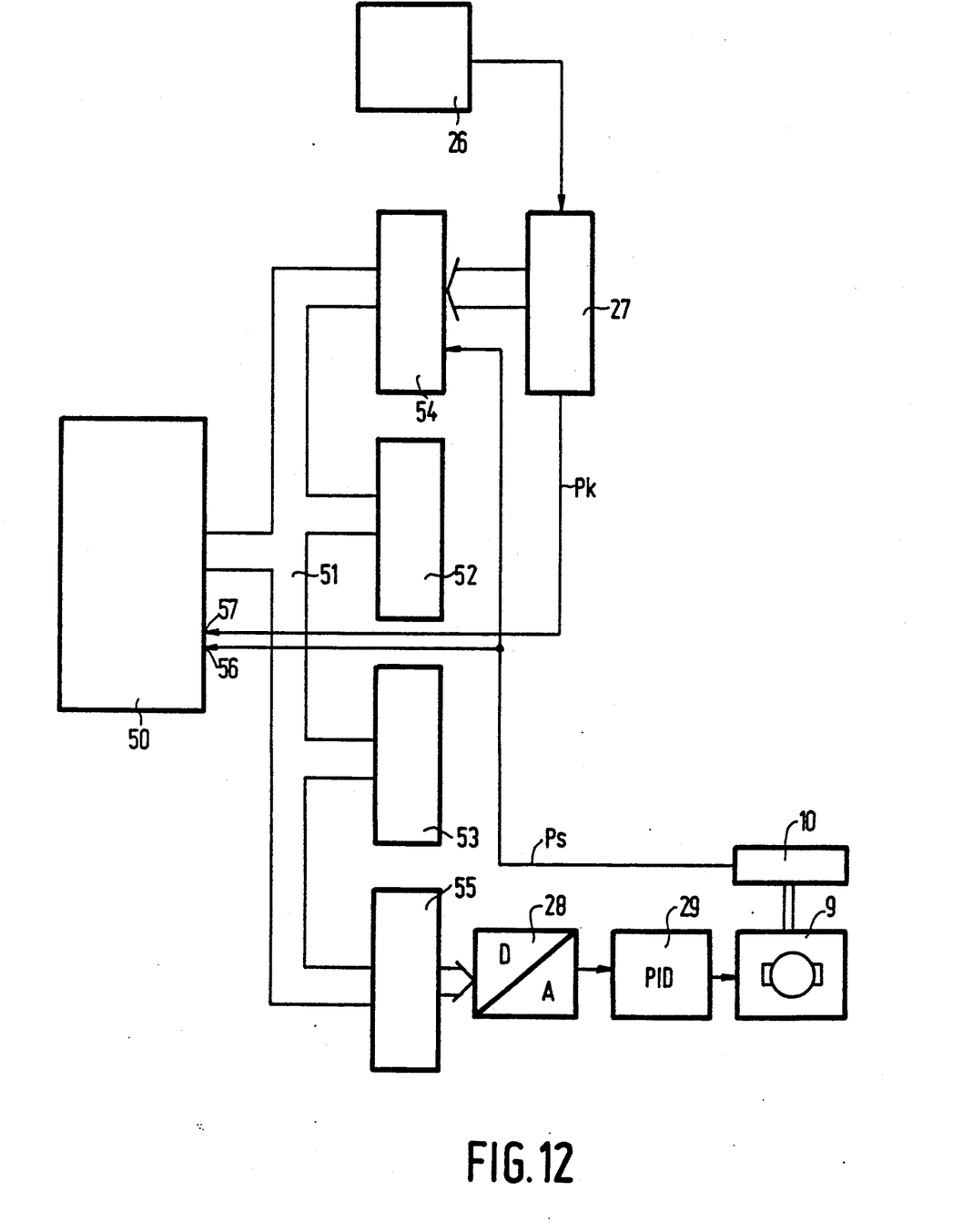
FIG. 12 shows yet another example of the control circuit.

FIG. 12 shows yet another example of the velocity control circuit 11 which together with the central processing means 12 is included in a microcomputer system of a customary type. However, it is to be noted that it is also possible to incorporate the central processing circuit and the velocity control circuit each in a separate computer system. The microcomputer system comprises a central processing unit 50 (CPU) which by means of a bus 51 is connected to a random-access memory 52 (RAM), a read-only memory 53 (ROM), the outputs of a latch-type input register 54, and the inputs of an output register 55. The count TEL of the counter 27 is transferred to the inputs of the input register 54.

Figure 4:
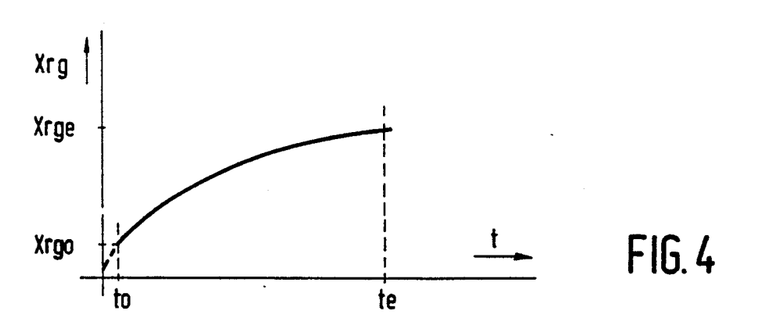
FIG. 4 is an example of the variation of the desired radial position Xrg as a function of time.
Figure 8:
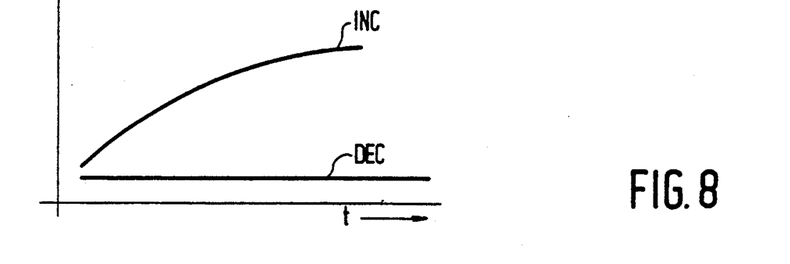
FIG. 8 shows an example of the desired variation of the correction values INC and DEC as a function of time during scanning.

The outputs of the output register 55 are connected to the inputs of the digital-to-analog converter 28. The read-only memory 53 is loaded with programs for adapting the sum value Sw in response to the velocity pulses Ps and the clock pulse Pk, for deriving the control value SR, for adapting the desired position Xrg and the values INC and DEC in conformity with interrelated time functions, for example those as shown in FIGS. 4 and 8. The function values of the functions are predetermined and stored in a table in the memory 52, or they are computed in accordance with a suitable algorithm during scanning.

Figure 13:
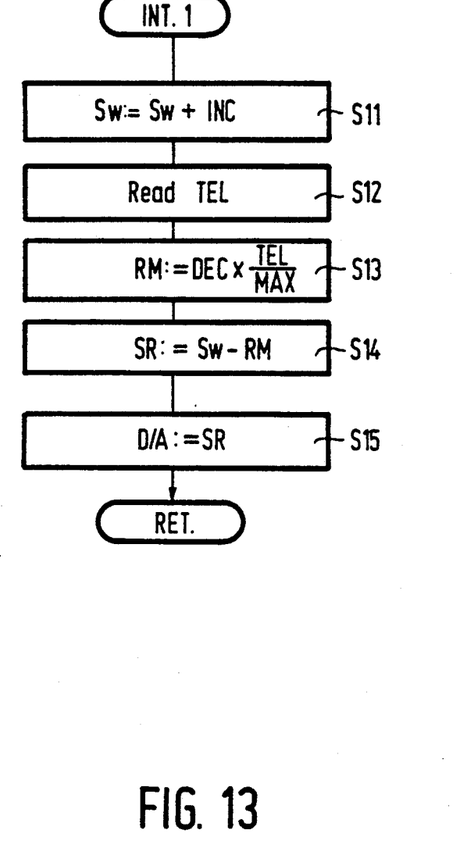
FIGS. 13 and 14 are flow charts of programs carried out by the computer in the control circuit of FIG. 12.
Figure 14:
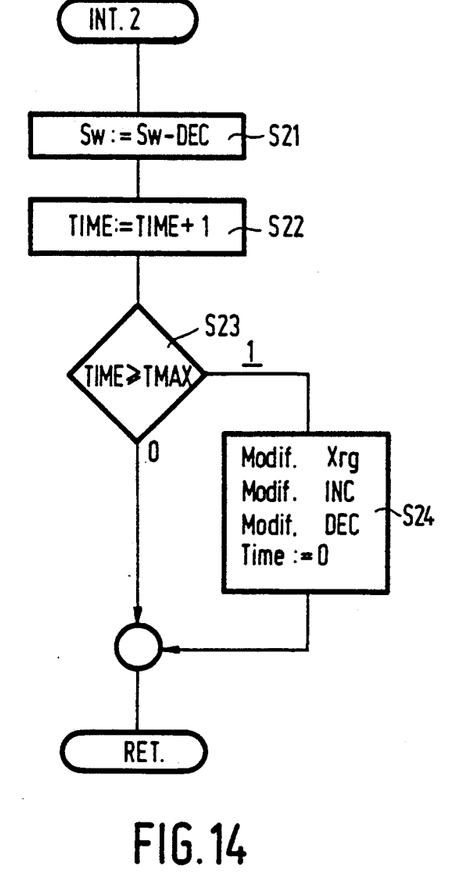

FIGS. 13 and 14, by way of illustration, give flow charts of examples of the above programs. The program INT1 is an interrupt program which is carried out in response to every velocity pulse Ps on a first interrupt input 56 of the central processing unit 50. In this program during the step S11 the sum value Sw is incremented by the value INC. Subsequently, in step S12 the count TEL of the counter 27 is read and in step S13 the value of RM is derived from the values of MAX, DEC and TEL. In step S14 the control value SR is derived from the values of Sw and RM and in step S15 the value SR is transferred to the digital-to-analog converter 28 by loading the output register 55. The program INT2 is an interrupt program which is carried out in response to a clock pulse Pk on a second interrupt input 57. During the step S21 of this program the sum value Sw is decremented by the value DEC. In step S22 the number of times TIME is counted that the program INT2 has been called after the last adaptation of the values of DEC, INC and Xrg. Since the frequency with which the program INT2 is called is constant, the value of TIME is always representative of the time which has elapsed since the last adaptation of INC, DEC and Xrg.

In step S23 it is ascertained whether the value of TIME is larger than or equal to a limit value TMAX. If it is, the values of Xrg, INC and DEC are adapted again and the value of TIME is set to zero in step S24. Adaptation of Xrg, DEC and INC is possible, for example, by making the values of Xrg, DEC and INC equal to the next function values of the functions stored in the table in the memory 52.

Figure 15:
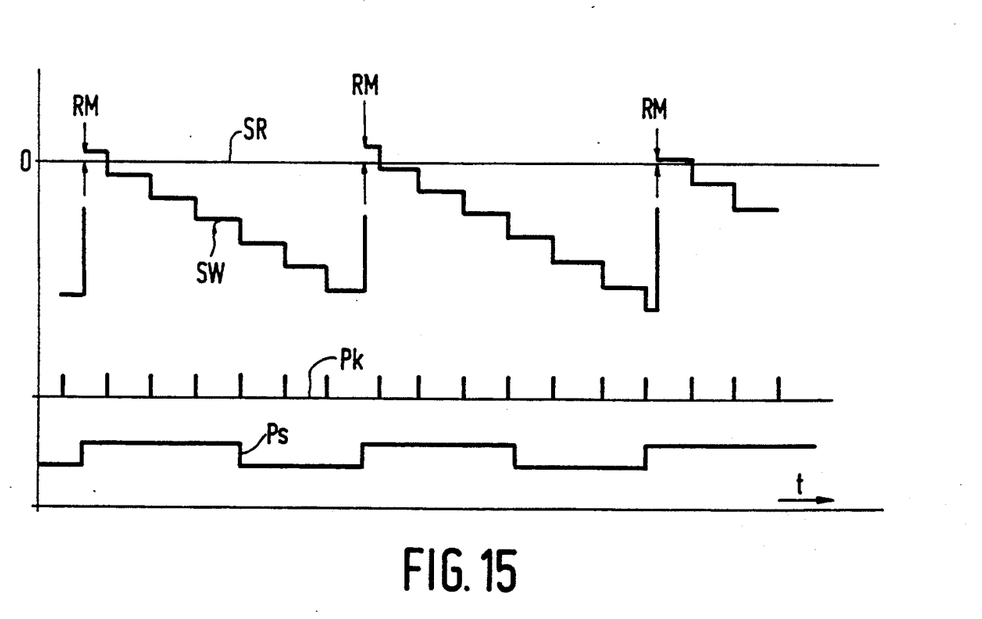
FIG. 15 shows variables, computed by means of the programs, as a function of time.

FIG. 15 shows the sum value Sw, the correction value RM and the control value SR, derived by means of the programs INT1 and INT2, as a function of time. The PID controller 29 controls the energisation of the motor 9 so as to maintain the control value SR equal to zero. The average value of Sw, which has a constant difference with the value SR, will therefore also be constant, so that by means of this control circuit the angular velocity is also maintained equal to a desired value Wg equal to $2\pi(fk \times INC/DEC)N$.

Now that particular embodiments of the present invention have been described in detail with reference to the accompanying drawing, it is to be understood that the invention is not limited to these embodiments, and that various modification and changes may be effected therein by those skilled in the art without departing from the scope or spirit of the invention as defined in the appended claims.

What is claimed is:

1. A method of scanning a radiation-sensitive layer of a disc-shaped carrier which rotates about a center of rotation by means of a radiation beam which is directed towards the carrier at a point of incidence removed from the center by a distance, the carrier having an angular velocity being substantially inversely proportional to the distance between the center and the point of incidence, the method comprising the steps of:

generating clock pulses of predetermined frequency and velocity pulses of a frequency proportional to the angular velocity of the carrier and the predetermined frequency being higher than that of the velocity pulses, correcting a sum value by a first correction value in response to a clock pulse;

correcting the sum value by a second correction value of a sign opposite to that of the first correction value in response to a velocity pulse;

controlling the angular velocity of the record carrier depending on the sum velocity so as to maintain a value for which the average of the sum value remains substantially constant, and maintaining the ratio between the second and the first correction value at a value proportional to said distance by changing the value of at least one of the first correction value and the second correction value.

2. A method as claimed in claim 2, characterized in that for controlling the angular velocity only sum values at instants corresponding to a predetermined phase of the velocity pulses are selected.

3. A method as claimed in claim 2, characterized in that the clock pulses are derived from a periodic signal of a higher frequency by means of a cyclic counter, a clock pulse being generated each time that a final count is reached, to correct the selected sum value by a third correction value equal to the ratio between the number of clock pulses counted, as represented by the instantaneous count, and the counting range of the counter, multiplied by the first correction value, and the angular velocity of the record carrier being controlled to a value for which the average of the corrected selected sum value is substantially constant.

4. A method as claimed in any one of the preceding claims, characterized in that by frequency division second clock pulses of a frequency lower than the frequency of the velocity pulses are derived from the velocity pulses, and in that the value of the second correction value is adapted with a specific constant value in response to each of said second clock pulses.

5. A device for scanning a radiation-sensitive surface of a rotating carrier by means of a radiation beam, the device comprising: a drive system for rotating the carrier about a center of rotation to provide an angular velocity, an optical system which is radially movable relative to the carrier, for directing the radiation beam towards the carrier to provide a point of incidence on the carrier removed a distance from the center, and a velocity control circuit for controlling the angular velocity of the carrier substantially inversely proportional to the distance between the center of rotation and the point of incidence of the radiation beam on the carrier; the velocity control circuit comprising a clock generator for generating clock pulses and a velocity-pulse generator for generating velocity pulses of a frequency proportional to the angular velocity of the carrier and the clock pulse frequency being higher than the velocity-pulse corresponding to a desired angular velocity, the velocity control circuit further comprising means for correcting a sum value by a first correction value in response to a velocity pulse, means for correcting the sum value by a second correction value, the control means for controlling the angular velocity according to the sum value so that the average sum value remains constant, and adaptation means for adjusting the angular velocity proportional to said distance by changing the value of at least one of the first correction value and the second correction value which determine angular velocity.

6. A device as claimed in claim 5, characterized in that the velocity control circuit comprises means for transferring the sum value to a memory in response to a velocity pulse, the control means being adapted to control the angular frequency to a value for which the average sum values consecutively stored in the memory remain substantially constant.

7. A device as claimed in claim 6, characterized in that the clock generator comprises an oscillator for generating pulses of a frequency higher than that of the clock pulses and a cyclic counter for counting the pulses from the oscillator and for generating a following clock pulse when a maximum count is reached, the velocity control circuit comprising means for multiplying the count by the first correction value to obtain a third correction value which is equal to the ratio between the count and the maximum count, multiplied by the first correction value, and means for transferring a sum value corrected by the third correction value to the memory in response to a velocity pulse.

8. A device as claimed in any one of the claims 5 to 7, characterized in that the device comprises a frequency divider for deriving second clock pulses from the velocity pulses by frequency divisions, and means responsive to the second clock pulses to adapt the second correction value with a specific constant value.

* * * * *